US009832163B1

(12) United States Patent
Biehn et al.

(10) Patent No.: US 9,832,163 B1
(45) Date of Patent: Nov. 28, 2017

(54) DATA PROCESSING SYSTEMS AND METHODS FOR ELECTRONICALLY PROCESSING SOCIAL MEDIA CONTENT

(71) Applicant: Ready For Social, LLC, Decatur, GA (US)

(72) Inventors: Alexander Gibson Biehn, Decatur, GA (US); Milan Ruzicka, The Hague (NL)

(73) Assignee: Ready for Social, LLC, Decatur, GA (US)

( * ) Notice: Subject to any disclaimer, the term of this patent is extended or adjusted under 35 U.S.C. 154(b) by 0 days.

(21) Appl. No.: 15/655,517

(22) Filed: Jul. 20, 2017

(51) Int. Cl.
*H04L 12/58* (2006.01)

(52) U.S. Cl.
CPC .............. *H04L 51/32* (2013.01); *H04L 51/10* (2013.01)

(58) Field of Classification Search
CPC .................................. H04L 51/32; H04L 51/10
See application file for complete search history.

(56) References Cited

U.S. PATENT DOCUMENTS

| | | | |
|---|---|---|---|
| 2013/0262188 A1* | 10/2013 | Leibner .................. | G06Q 30/02 705/7.36 |
| 2015/0170294 A1* | 6/2015 | Goyal .................... | G06Q 50/01 705/14.61 |
| 2016/0094508 A1* | 3/2016 | Nomura .................. | H04L 51/32 709/206 |
| 2016/0366089 A1* | 12/2016 | Bank ....................... | H04L 51/32 |
| 2017/0228384 A1* | 8/2017 | Caruso ............. | G06F 17/30073 |
| 2017/0237698 A1* | 8/2017 | Besnard .................. | H04L 51/18 709/206 |

* cited by examiner

*Primary Examiner* — Arvin Eskandarnia
(74) *Attorney, Agent, or Firm* — Brient Globerman, LLC (57) ABSTRACT

Data processing systems and methods for processing social media content include a social media module having access to multiple social media platforms associated with a user. The social media module receives media content preferences from the user and retrieves social media content according to those preferences. The social media module provides social media posts corresponding to the retrieved content and schedules the social media posts for distribution over a determined time period. The social media module posts the social media posts across multiple social media platforms according to the schedule over the determined time period.

21 Claims, 7 Drawing Sheets

DATA PROCESSING SYSTEMS AND METHODS FOR ELECTRONICALLY PROCESSING SOCIAL MEDIA CONTENT

TECHNICAL FIELD

This disclosure relates to a data processing system and methods for electronically creating, scheduling, and posting social media content across multiple social media platforms.

BACKGROUND

For many businesses, having an active online presence is beneficial. As an example, companies often use social media as a means for distributing articles, blogs, images, and any other content that may spark an interest among their customers or prospective customers. By actively posting content that is relevant to their industry, companies can demonstrate that they are acutely aware of the applicable issues surrounding their business and highlight the benefits of the products or services that the company provides.

Sharing content via social media often requires sales people to spend significant quantities of time searching online content for information to share. After finding applicable content, the sales people must analyze the content and create original short summaries to show the relevance of the content to the company. The sales people then must log into the desired social media sites, upload the content, and create the postings for prospective clients to view. To be effective, the sales people must dedicate sufficient time to the process to understand the optimal frequency of posting to social media, to optimize the timing of the posts to maximize the number of views that the posts receive, and to repeat the process over multiple social media platforms. The entire process is often tedious, time consuming, prone to error, and costly.

Existing content aggregation services do not alleviate the need to search for relevant topics, and write topical social media posts that highlight a portion of the content that is relevant or meaningful. Conventional content aggregation services provide suboptimal results in terms of audience reach and customization of content delivery.

In light of the above, there is currently a need for improved systems and methods for electronically creating, scheduling, and distributing relevant content through multiple social media platforms.

SUMMARY

It should be appreciated that this Summary is provided to introduce a selection of concepts in a simplified form that are further described below in the Detailed Description. This Summary is not intended to be used to limit the scope of the claimed subject matter.

A computer-implemented data processing system and method is operable for electronically processing social media content. According to one aspect, the system provides a social media module with access to a number of social media platforms associated with a user. Media content preferences associated with a preferred media content of the user are received by a social media module of the system. The social media module receives social media content according to the media content preferences and provides a number of social media posts corresponding to the social media content. The social media posts are scheduled for posting over a determined time period and posted to the social media platforms according to the schedule.

According to another aspect, the system is operable for providing a social media module with access to multiple social media platforms associated with a user. The social media module receives one or more preferred categories of media content selected from a number of categories. Social media content is received by the social media module according to the preferred categories. A number of selectable social media posts are provided on a display screen according to the social media content and to a desired number of social media posts per a determined time period. When selected, each social media post is displayed and configured for editing within a panel without leaving the display screen. The social media posts are scheduled for posting over the determined time period and posted according to the schedule.

According to yet another aspect, the system creates a number of social media posts according to media content preferences associated with a preferred media content of a user. The system schedules the social media posts for posting over a determined time period. A notification is sent to the user of completion of the social media posts prior to the determined time period. If access to the plurality of social media posts is not requested by the user prior to the determined time period, the system posts the social media posts to a number of social media platforms according to the schedule over the determined time period. If access to the plurality of social media posts is requested by the user prior to the determined time period, the system provides the media posts on a display screen, each post being selectable for viewing and editing within a panel without leaving the display screen.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

Various embodiments of a system and method for electronically processing social media content are described below. In the course of this description, reference will be made to the accompanying drawings, which are not necessarily drawn to scale, and wherein.

DETAILED DESCRIPTION

The following detailed description is directed to systems for processing social media posts, and corresponding methods for utilizing the same. As discussed above, conventional processes for searching for social media content, analyzing that content, creating social media posts corresponding to the content, and posting the social media posts across multiple platforms is cumbersome and time consuming. Traditional use of sales people to manually perform this process requires a substantial amount of time that is often not available or cost effective. As a result, providing relevant and impactful social media posts across multiple social media platforms on a regular basis is often not sustainable.

Utilizing the concepts and technologies described herein, a social media processing system automates and optimizes the social media posting process. The various embodiments discussed herein provide a user with an efficient means for finding articles and other social media content, writing corresponding social media posts, and regularly sharing the posts across various and multiple social media platforms according to a desired schedule. The process is automated, generating a desired number of social media posts that may be reviewed, edited, and posted across multiple social media platforms. The user may customize the process by determining the category associated with the social media content to post, the number of posts per week or other time period per category, and other personalization.

The system and methods described herein allow the user to add manual social media posts to the generated posts, as well as allowing the user to review the generated posts for all social media platforms in one location without navigating to various web pages and edit all aspects of the generated posts before they are posted per the schedule. The schedule may also be modified as desired prior to automated posting. If the user takes no action, the generated and any manual social media posts will be posted automatically according to the generated schedule. This automated process substantially frees up time that would conventionally be used by sales or other personnel in keeping the associated company's social media presence active and relevant.

Before referring to the drawings and discussing specific embodiments of the disclosure, exemplary technical platforms will be discussed. As will be appreciated by one skilled in the relevant field, a system for processing social media posts may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web, mobile, wearable computer-implemented, computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems) and computer program products. It should be understood that each operation of the block diagrams and flowchart illustrations, and combinations of operations in the block diagrams and flowchart illustrations, respectively, may be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart operation or operations.

These computer program instructions may also be stored in a computer-readable memory that may direct a computer or other programmable data processing apparatus to function in a particular manner such that the instructions stored in the computer-readable memory produce an article of manufacture that is configured for implementing the function specified in the flowchart operation or operations. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart operation or operations.

Accordingly, operations of the block diagrams and flowchart illustrations support combinations of mechanisms for performing the specified functions, combinations of operations for performing the specified functions, and program instructions for performing the specified functions. It should also be understood that each operation of the block diagrams and flowchart illustrations, and combinations of operations in the block diagrams and flowchart illustrations, may be implemented by special purpose hardware-based computer systems that perform the specified functions or operations, or combinations of special purpose hardware and other hardware executing appropriate computer instructions.

In the following detailed description, references are made to the accompanying drawings that form a part hereof, and which are shown by way of illustration, specific embodiments, or examples. Referring now to the drawings, in which like numerals represent like elements through the several figures, a social media post processing system and method for utilizing the same according to the various embodiments will be described.

Figure 1:
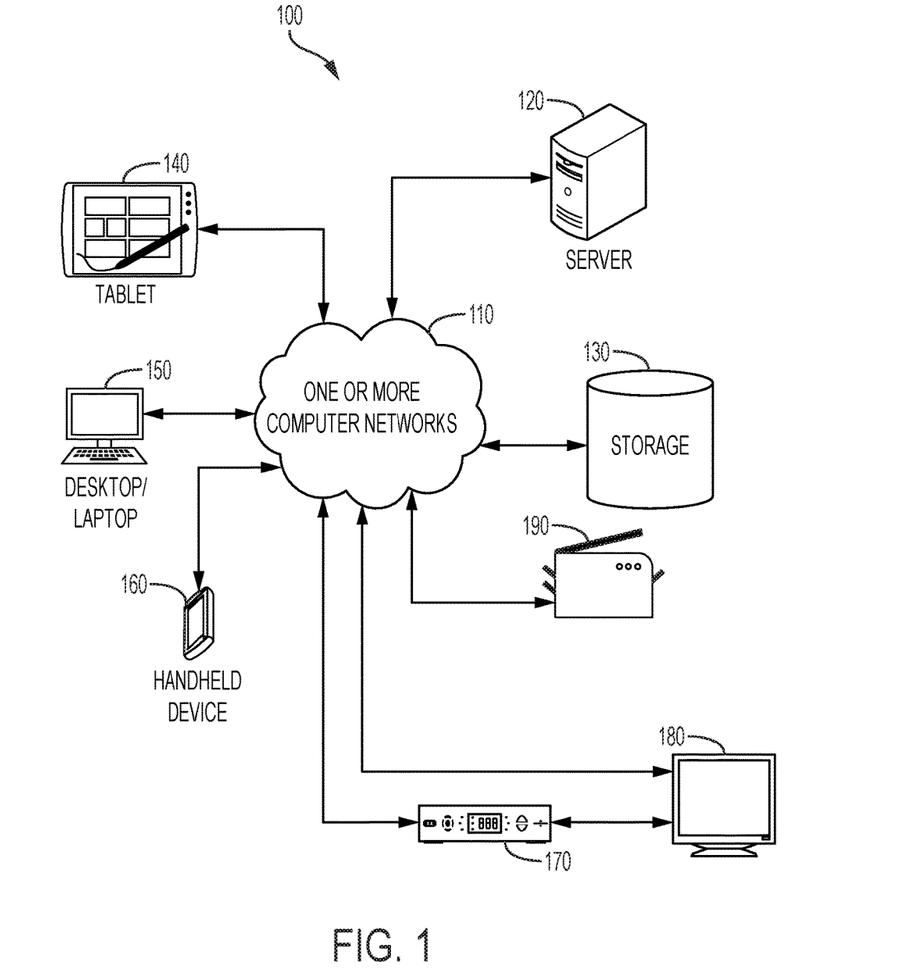
FIG. 1 is diagram illustrating an exemplary network environment in which the present system and methods for processing social media content may operate according to various embodiments described herein.

FIG. 1 shows an example system architecture applicable to the various embodiments described below. FIG. 1 is a block diagram of a system 100 according to a particular embodiment. As may be understood from this figure, the system 100 includes one or more computer networks 110, a server 120, a storage device 130 (which may contain one or more databases of information), one or more remote client computing devices such as a tablet computer 140, a desktop or laptop computer 150, or a handheld computing device 160, such as a cellular phone, browser and Internet capable set-top boxes 170 connected with a TV 180, or even smart TVs 180 having browser and Internet capability. The client computing devices attached to the network may also include copiers/printers 190 having hard drives (a security risk since copies/prints may be stored on these hard drives). The server 120, client computing devices, and storage device 130 may be physically located in a central location, such as the headquarters of the organization, for example, or in separate facilities. The devices may be owned or maintained by employees, contractors, or other third parties (e.g., a cloud service provider). In particular embodiments, the one or more computer networks 115 facilitate communication between the server 120, one or more client computing devices 140, 150, 160, 170, 180, 190, and storage device 130.

The one or more computer networks 115 may include any of a variety of types of wired or wireless computer networks such as the Internet, a private intranet, a public switched telephone network (PSTN), or any other type of network. The communication link between the server 120, one or more client computing devices 140, 150, 160, 170, 180, 190, and storage device 130 may be, for example, implemented via a Local Area Network (LAN) or via the Internet.

Figure 2:
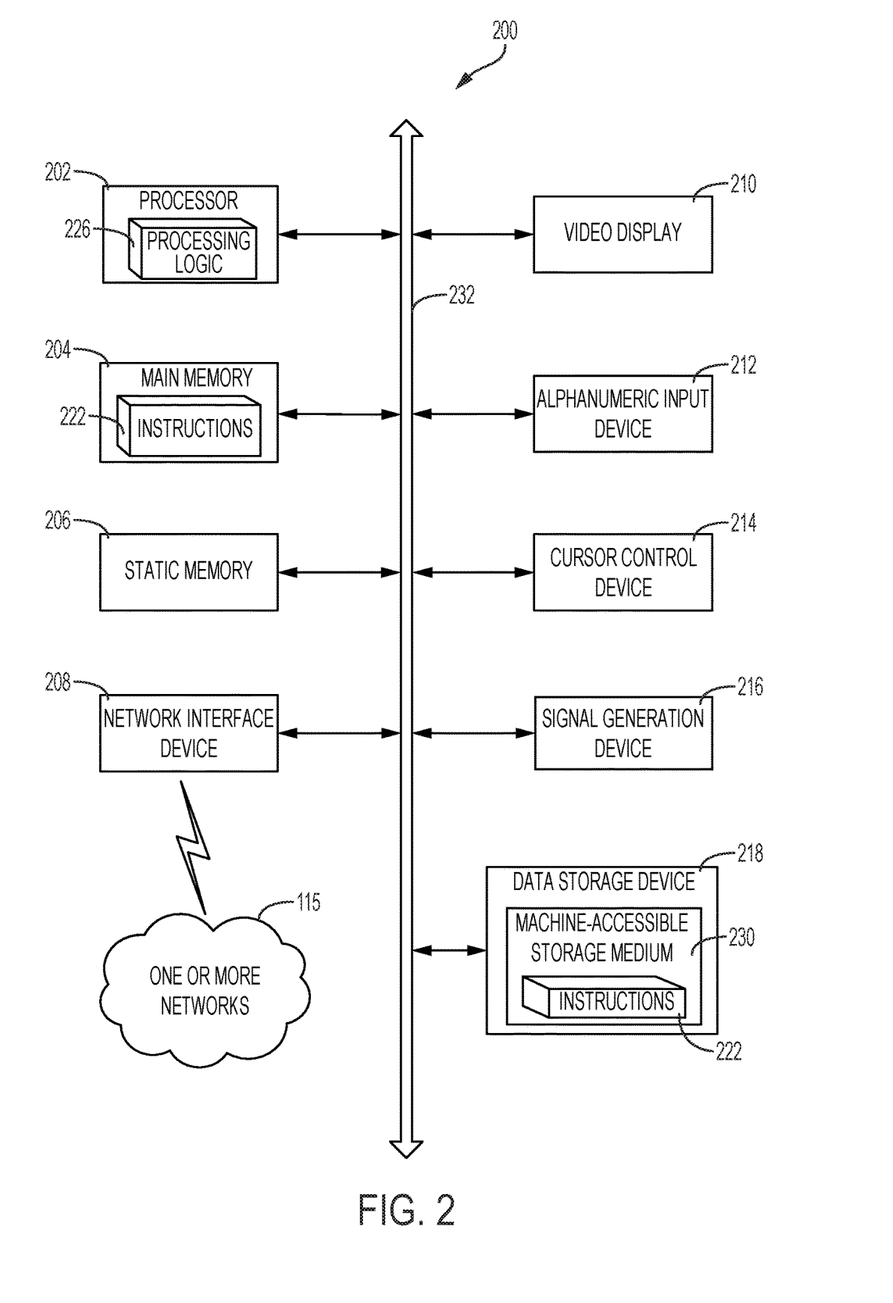
FIG. 2 is a schematic diagram of a computer (such as the server 120, or user device 140, 150, 160, 170, 180, 190) that is suitable for use in various embodiments described herein.

FIG. 2 illustrates a diagrammatic representation of the architecture of a computer 200 that may be used within the system 100, for example, as a client computer (e.g., one of computing devices 140, 150, 160, 170, 180, 190, shown in FIG. 1), or as a server computer (e.g., Server 120 shown in FIG. 1). In exemplary embodiments, the computer 200 may be suitable for use as a computer within the context of the system 100 that is configured to operationalize privacy compliance and assess risk of privacy campaigns. In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The computer 200 may be a personal computer (PC), a tablet PC, a set-top box (STB), a personal digital assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations discussed herein.

The computer 200 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker). The data storage device 218 may include a non-transitory computer-readable storage medium 230 (also known as a non-transitory computer-readable storage medium or a non-transitory computer-readable medium) on which is stored one or more sets of instructions 222 (e.g., software, software modules) embodying any one or more of the methodologies or functions described herein. The software 222 may also reside, completely or at least partially, within main memory 204 and/or within processing device 202 during execution thereof by computer 200—main memory 204 and processing device 202 also constituting computer-accessible storage media. The software 222 may further be transmitted or received over a network 220 via network interface device 208.

While the computer-readable storage medium 230 is shown in an exemplary embodiment to be a single medium, the terms "computer-readable storage medium" and "machine-accessible storage medium" should be understood to include a single medium or multiple media (e.g., a centralized or distributed database, and/or associated caches and servers) that store the one or more sets of instructions. The term "computer-readable storage medium" should also be understood to include any medium that is capable of storing, encoding or carrying a set of instructions for execution by the computer and that cause the computer to perform any one or more of the methodologies of the present disclosure. The term "computer-readable storage medium" should accordingly be understood to include, but not be limited to, solid-state memories, optical and magnetic media, etc.

According to various embodiments, the processes and logic flows described in this specification may be performed by a system (e.g., system 100) that includes, but is not limited to, one or more programmable processors (e.g., processor 202) executing one or more computer program modules to perform functions by operating on input data and generating output, thereby tying the process to a particular machine (e.g., a machine programmed to perform the processes described herein). This includes processors located in one or more of client computers (e.g., client computers 140, 150, 160, 170, 180, 190 of FIG. 1). These devices connected to network 110 may access and execute one or more Internet browser-based program modules that are "served up" through the network 110 by one or more servers (e.g., server 120 of FIG. 1), and the data associated with the program may be stored on a one or more storage devices, which may reside within a server or computing device (e.g., main memory 204, static memory 206), be attached as a peripheral storage device to the one or more servers or computing devices, or attached to the network (e.g., storage 130).

Figure 3:
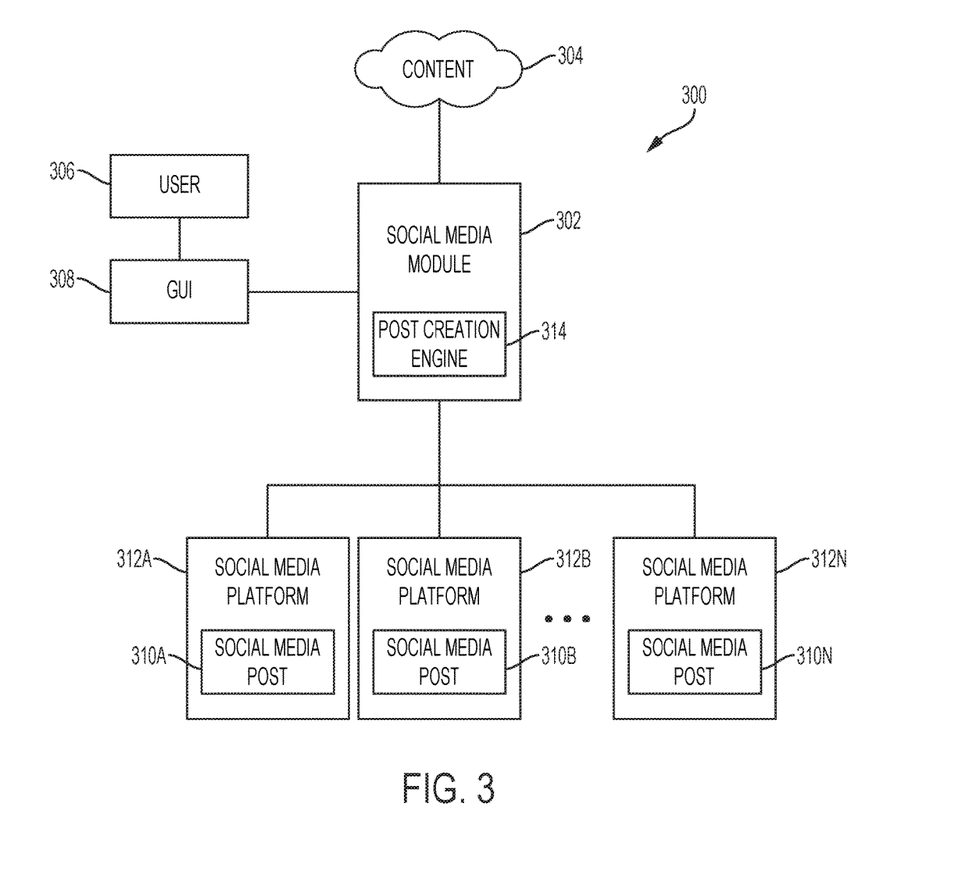
FIG. 3 is a diagram illustrating an example of various components of a system for processing social media content according to various embodiments described herein.

Turning now to FIG. 3 provides a high-level visual overview of an example social media processing system 300 for generating and posting social media content per a customizable schedule. According to various embodiments, a social media module 302 utilizes social media content 304 to create social media posts 310A-310N (generically referred to as "social media posts 310" or "posts 310") for posting to any number of social media platforms 312A-312N (generically referred to as "social media platforms 312"). As used herein, the term "module" may refer to one or more sets of instructions 222 (e.g., software, software modules) stored on a non-transitory computer-readable storage medium 230. The social media module 302 utilizes a post creation engine 314 to analyze the social media content 304 and create the corresponding social media posts 310. The post creation engine 314 may be a part of the set of instructions 222 incorporated into the social media module 302. Alternatively, the post creation engine 314 may be a separate software module or any entity that creates the social media posts 310 from the social media content 304 and provides the social media posts 310 to the social media module 302.

A user 306 interacts with the social media processing system 300 via a GUI 308. As discussed above, the user 306 may include sales people, any type of business that benefits from maintaining an online presence, as well as individual or groups of users that are active on social media for personal or other reasons. The GUI 308 may be any type of interface that presents information to the user 306 and allows the user 306 to provide input via prompts, editable entry fields, check boxes, radial selectors, text, and the like. Input to the GUI 308 may be made with a keyboard, virtual keyboard, mouse, touchpad, trackball, joystick, or any other means including voice or motion control. Examples of a GUI 308 according to various embodiments will be described in greater detail below with respect to FIGS. 4-7.

The social media content 304 may include any type and quantity of subject matter in electronic form, typically available via online sources. Example social media content 304 may include electronic articles, blogs, images, videos, and other website content. The social media content 304 is used by the social media module 302 to create social media posts 310 for posting on any number and type of social media platforms 312 for which the user 306 has an account. For example, the user 306 may wish to post a desired number of posts per week on Twitter, Facebook, and LinkedIn. The social media module 302 has access to the social media platforms 312 for posting to the user's 306 applicable accounts using login and password credentials provided via the GUI 308. The social media posts 310 will be discussed below with respect to FIG. 5.

Referring now at FIG. 4, a screen diagram 400 of an example GUI 308 showing summary social media post information according to various embodiments will be described. The GUI 308 illustrates a sample dashboard screen 422 that may be displayed when the user 306 logs into the social media processing system 300. The GUI 308 includes a screen selection list 402 across the top that provides selectable on-screen buttons or tabs for navigating through the available screens of the GUI 308. In this example, there are selectable on-screen buttons corresponding to the dashboard, a post listing, a calendar, and a reports screen. The dashboard selector 404 is highlighted to indicate that the current screen corresponds to the dashboard screen 422. The dashboard screen 422 provides user information 406, which may include, but is not limited to, an image, user name, location, membership date, last login, and email address.

Post information 408 provides information regarding pending posts, as well as posting history and statistics. For example, according to the illustrated embodiment, the post information 408 includes an "available new posts" on-screen button 410, a "posts scheduled" on-screen button 412, a "posts viewed" on-screen button 414, and a "posts shared this month" on-screen button 416. In this example, the "available new posts" on-screen button 410 provides the user 306 with a quick way in which to see how many new social media posts 310 are available from the social media module 302 for review and editing. Upon selection of this "available new posts" on-screen button 410, the user 306 is provided with a new screen that displays all available new social media posts 310, similar to that shown and described below with respect to FIG. 6. In this example, the number "0" indicates that there are no new posts available for review.

The "posts scheduled" on-screen button 412 indicates that there are 16 social media posts 310 scheduled for posting in the future. A selection of the "posts scheduled" on-screen button 412 allows the user 306 to view these 16 social media posts 310 and edit or re-schedule the day or time in which the social media posts 310 will be posted to the applicable social media platforms 312. The "posts viewed" on-screen button 414 indicates that social media posts 310 from the user 306 have been viewed 159 times since a determined time period. The determined time period may be the period between automatic postings by the social media module 302, such as a week if the social media processing system 300 is configured to provide and post social media posts 310 on a weekly basis. Alternatively, the determined time period may be the time period since the dashboard was last accessed by the user 306.

The "posts shared this month" on-screen button 416 provides an indicator to the user 306 of how many social media posts 310 have been shared by others over the prior month or determined time period. In this example, 35 of the social media posts 310 posted to social media platforms 312 over the past month were shared by others. By selecting the "posts shared this month" on-screen button 416, the user 306 may view the posts that were shared by others.

Figure 4:
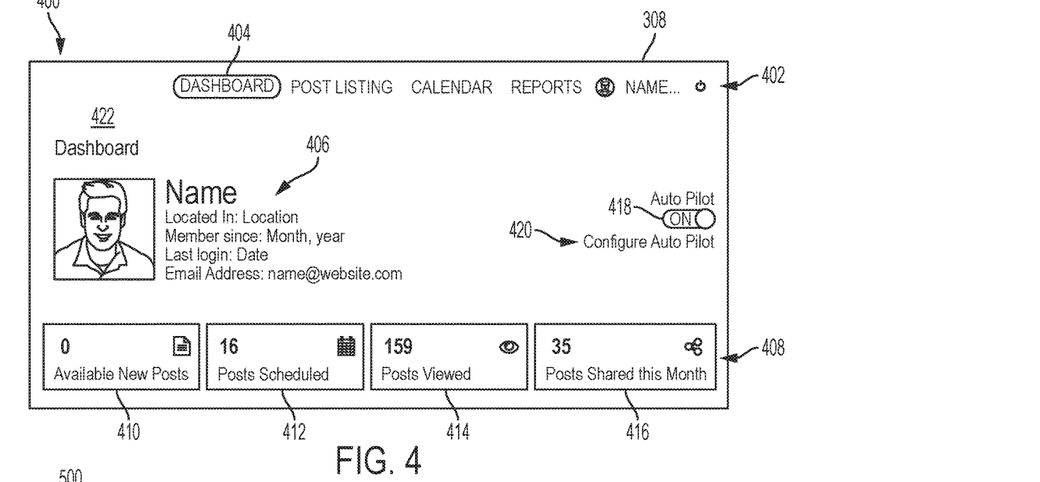
FIG. 4 is an example screen diagram showing summary social media post information according to various embodiments described herein.

It should be understood that the embodiments described herein are not limited to the post information 408 described in the example shown in FIG. 4. Rather, any quantity and type of post information 408 may be displayed, including none at all, without departing from the scope of this disclosure. Further, the post information 408 may display information to the user without providing on-screen buttons that are used to navigate to additional screens for further user action or information.

According to various embodiments, the social media processing system 300 provides the user 306 with an Auto Pilot activation switch 418 to activate and deactivate the automated process in which the social media posts 310 are created according to categories or other user preferences and scheduled for posting according to a desired timeframe across multiple social media platforms 312. According to the example shown described throughout this disclosure, this automation feature is referred to as "Auto Pilot," but is not limited to any particular name. The user 306 may select the "configure Auto Pilot" link 420 to provide a GUI 308 for entering media content preferences associated with the preferred media content and the subsequent distribution of the corresponding social media posts 310.

Figure 5:
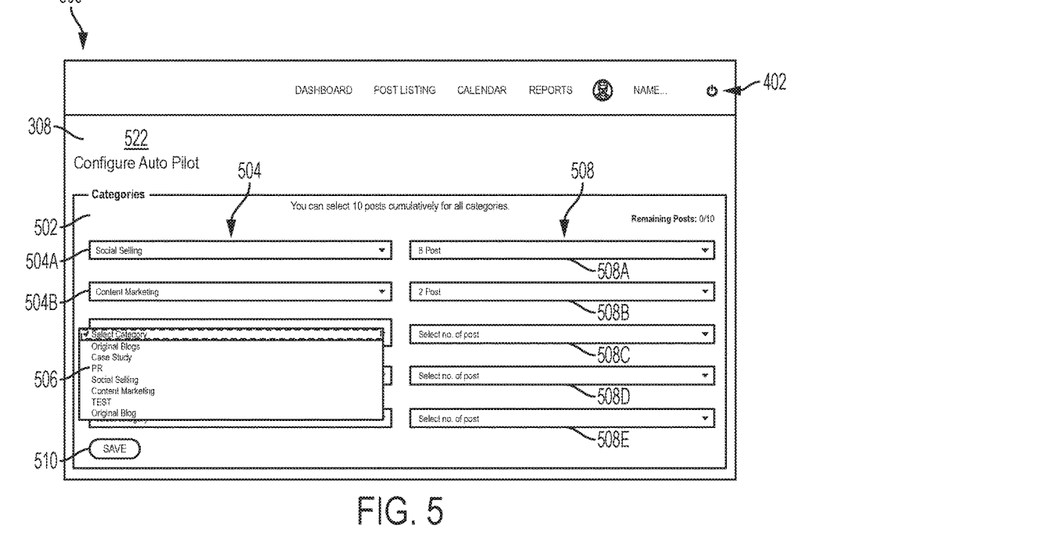
FIG. 5 is an example screen diagram showing a graphical user interface (GUI) for providing media content preferences according to various embodiments described herein.

Upon receiving a selection of the "configure Auto Pilot" link 420, the social media module 302 provides an Auto Pilot configuration screen 522, which is illustrated as a screen diagram 500 in FIG. 5. Auto Pilot allows the user 306 to customize the social media posts 310 to optimize the content for the desired audience. The user 306 inputs a number of media content preferences 502 into the Auto Pilot configuration screen 522 that supply the social media module 302 with parameters with respect to the preferred media content of the user 306 and the distribution of the social media posts 310.

According to various embodiments, the media content preferences 502 include categories 504 of social media content 304. The categories 504 are groupings of like social media content 304 according to media content subject matter, media content source, user-defined parameters, or any other content characterization. For example, the user 306 has selected "Social Selling" as category 504A, and "Content Marketing" as category 504B. Accordingly, the social media content 304 used to create social media posts 310 by the post creation engine 314 will be at least in part have subject matter related to social selling and content marketing categories. Another example of a category 504 may include a particular source of the social media content 304. For example, the user 306 may desire social media posts 310 about subject matter that originated from blogs or case studies. It should be appreciated that media content subject matter and media content source are two examples of categories 504 and that the categories 504 are not limited to any particular type or quantity of content groupings.

Each category may be selected using a drop down menu 506. The categories 504 may be pre-determined such that the user 306 is able to select from only the categories 504 provided in the drop down menu 506. Alternatively, the user 306 may be able to define custom categories 504. The social media module 302 receives social media content 304 corresponding to the categories 504 selected by the user 306. In doing so, the corresponding social media posts 310 are specifically tailored to the user's business or target audience.

Another feature of Auto Pilot according to various embodiments includes the ability to select the post quantity 508 per category 504 to determine the preferred post distribution of the allotted number of social media posts 310 per week or other time period. The example shown in FIG. 5 allows the user 306 to select 10 posts per week for all selected categories 504. For each single category 504, the Auto Pilot configuration screen 522 provides a post quantity 508A-508E so that the user 306 may control the amount of social media content 304 that is posted per desired category 504 per week. For example, the post quantity 508A corresponds to the category 504A, so the user 306 has determined that it is desirable to have 8 social media posts 310 per week that include subject matter associated with the social selling category. The user 306 has then dedicated the 2 remaining social media posts 310 (as illustrated by post quantity 508B) to social media content 304 related to content marketing (as illustrated by category 504B). The embodiments described herein are not limited to any particular number of total posts per week or post quantities 508 per category 504. After the user 306 has configured Auto Pilot with the desired categories 504 and post quantities 508, the user 306 selects button 510 to save the media content preferences and exit the Auto Pilot configuration screen 522.

Once the user 306 has configured Auto Pilot by saving media content preferences 502, the social media module 302 will provide a number of social media posts 310 for review. As discussed above, the social media module 302 utilizes a post creation engine 314 to analyze social media content 304 and create the corresponding social media posts 310 according to the media content preferences 502 of the user 306. Alternatively, the post creation engine 314 may be a separate software module or any entity that creates the social media posts 310 from the social media content 304 and provides the social media posts 310 to the social media module 302. Irrespective of the type of post creation engine 314, the resulting posts 310 may be provided to the user 306 by the social media module 302 for review and editing. As will be described in greater detail below, the social media posts 310 may be provided on a particular day of the week for review and automatic posting over the course of the following week or other determined time period according to a desired posting schedule. One approach for the user 306 to access the social media posts 310 is for the user 306 to select the post listing selector 604 from the screen selection list 402 across the top of the GUI 308. Doing so launches the post listing screen 622, which is illustrated by on-screen diagram 600 of FIG. 6.

Figure 6:
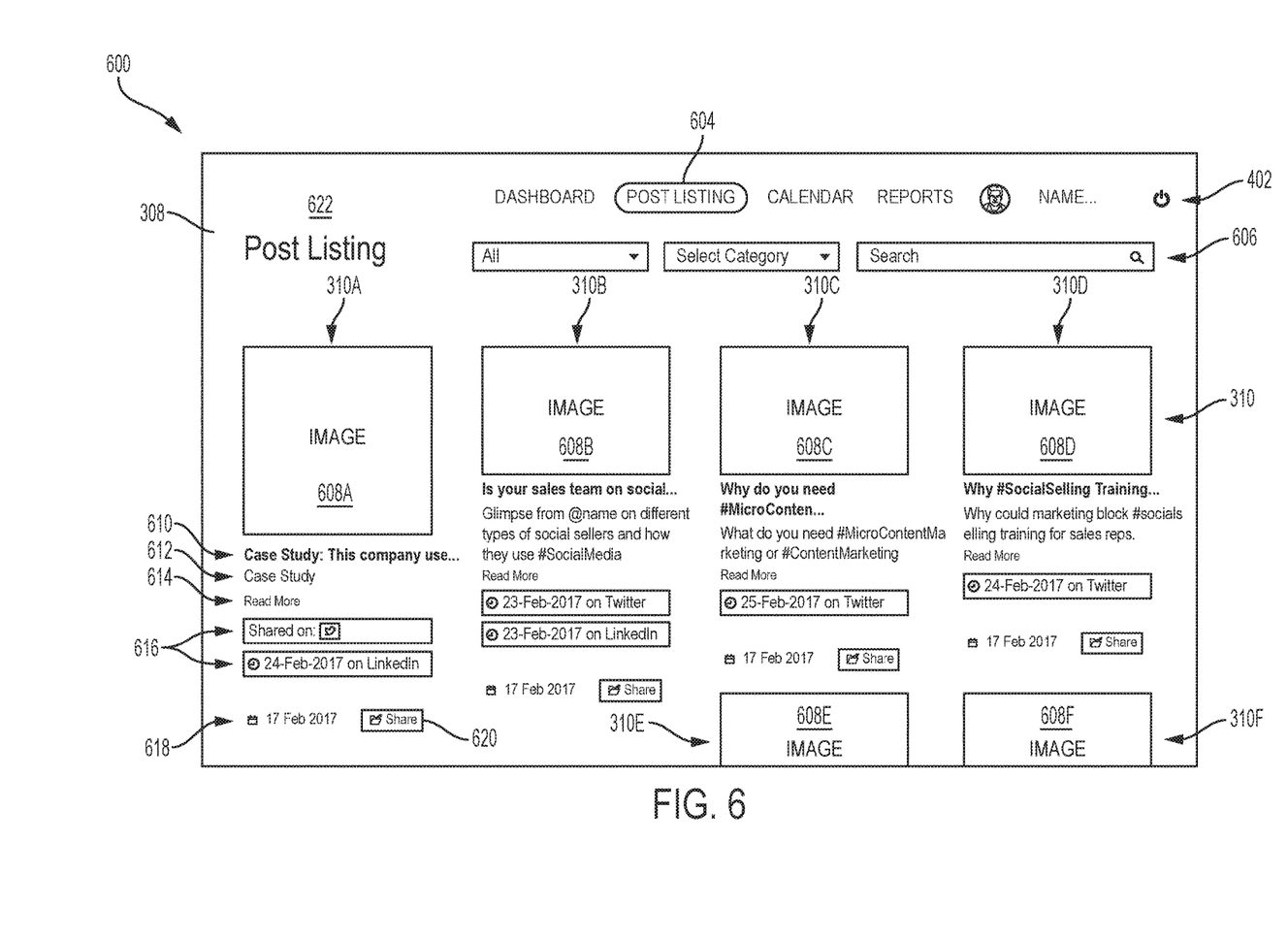
FIG. 6 is an example screen diagram showing selectable social media posts scheduled for a determined time period according to various embodiments described herein.

The post listing screen 622 shows the social media posts 310 organized on a single scrollable page for review and editing. The example shown in FIG. 6 shows at least partial views of six social media posts 310A-310F to illustrate one potential layout of the posts. The remaining portions of social media posts 310E and 310F would be visible as the user 306 scrolled down with a mouse or other input device. Each social media post 310 may have multiple components. For example, each social media post 310A-310F may have an image 608A-608F (generally referred to herein as "image 608"), a caption 610, a summary 612, a content link 614, a posting schedule link 616, a creation date 618 indicating the date on which the post 310 was created, and a share link 620. For clarity purposes, reference numbers were only provided for each of the components of social media post 310A, but it should be understood that the detailed description with respect to social media post 310A may apply to social media posts 310B-310F, as well as any others.

Looking at social media post 310A, the post 310 may include an image 608 that is selected from the social media content 304. The caption 610 provides a title that is written to grab the reader's attention. The summary 612 is a brief synopsis of the article or social media content 304, or provides more information on what the reader will learn if they select the content link 614. The content link 614, when selected, takes the reader to the full article or social media content 304. The social media module 302 may ensure that duplicate social media content 304 being posted by the user 306, or by the user 306 and another user within the same organization, receives different captions 610 or summaries 612. Doing so provides unique postings across social media platforms 312 or between multiple users within a company or other organizations.

According to some embodiments, any or all of the components of the social media post 310 may be selectable to provide the reader with the full article or corresponding social media content 304. One beneficial aspect of the post listing screen 622 provided by the social media module 302 is the manner in which social media posts 310 may be reviewed and edited. When the user 306 selects the content link 614 or any other selectable component of the post that provides the full article or social media content 304 is displayed in a panel or window inside or on top of the post listing screen 622 without navigating away from the screen. This feature significantly simplifies and accelerates the review and editing process since all posts 310 are readily available, viewable, and editable on a single screen.

According to one aspect of the social media processing system 300, the user 306 may configure the social media module 302 to provide the caption 610 and/or the summary 612 in a "voice" or language tone that when read by an audience, presents the information in a particular style or character. For example, some people would like to present some information in a more formal or professional voice that is grammatically correct and appropriate for the industry or business of the target audience. Others may wish to portray the information as an informal voice, presenting the information in a more relaxed grammatical manner or relaxed tone. This informal voice may be appropriate when providing information with an opinion, or when presenting anecdotal or information that is secondary to the user's business. When providing humorous information or when the intended target audience includes family or friends rather than professional colleagues, a sarcastic voice or a humorous voice may be desired. The voice selection may be customized via the Auto Pilot configuration screen 522 by providing additional drop down menus (not shown) that present the user 306 with any number of voice options corresponding to each category 504 of social media content 304. The social media module 302 will then apply a pre-programmed set of grammar rules associated with the selected voice to a corresponding social media post 310 during creation or delivery.

Looking again at the social media post 310A in FIG. 6, the posting schedule link 616 shows the user 306 when and to which social media platform 312 the post 310 is scheduled to be posted, or was posted. For example, the posting schedule link 616 for post 310A informs the user that it was previously posted on Twitter and is scheduled to be posted on LinkedIn on Feb. 24, 2017. Although there is no date associated with the prior posting on Twitter, the posting date could be provided on the posting schedule link 616. It should be appreciated that any amount and type of information could be presented on or with the posting schedule link 616 to visually depict scheduling information for any given post 310. For example, the posting schedule links 616 could be color coded or otherwise distinguished from one another to indicate past versus scheduled future posts, or to distinguish the social media platform 312 to which the content was posted. The posting schedule links 616 may be selectable. Upon selection, the schedule for the future posting may be revised, or more information provided as to past postings. The share link 620 provides a means for the user 306 to instantly post the content without regard to the schedule shown on the posting schedule links 616.

As described above, Auto Pilot allows the user 306 to provide a number of media content preferences 502 that focus the subject matter of the social media content 304 on selected categories 504, as well as to distribute the total number of posts per week according to the desired number of posts for each selected category 504. For the purposes of this disclosure, examples will be described in which the social media processing system 300 creates and schedules social media posts 310 on a weekly basis according to the category 504 and post quantity 508 configured by the user 306. Specifically, the Auto Pilot feature described herein provides for the autonomous scheduling and posting of social media content on a weekly basis. However, it should be understood that this autonomous functionality may occur according to any determined time period and is not limited to a weekly process.

Figure 7:
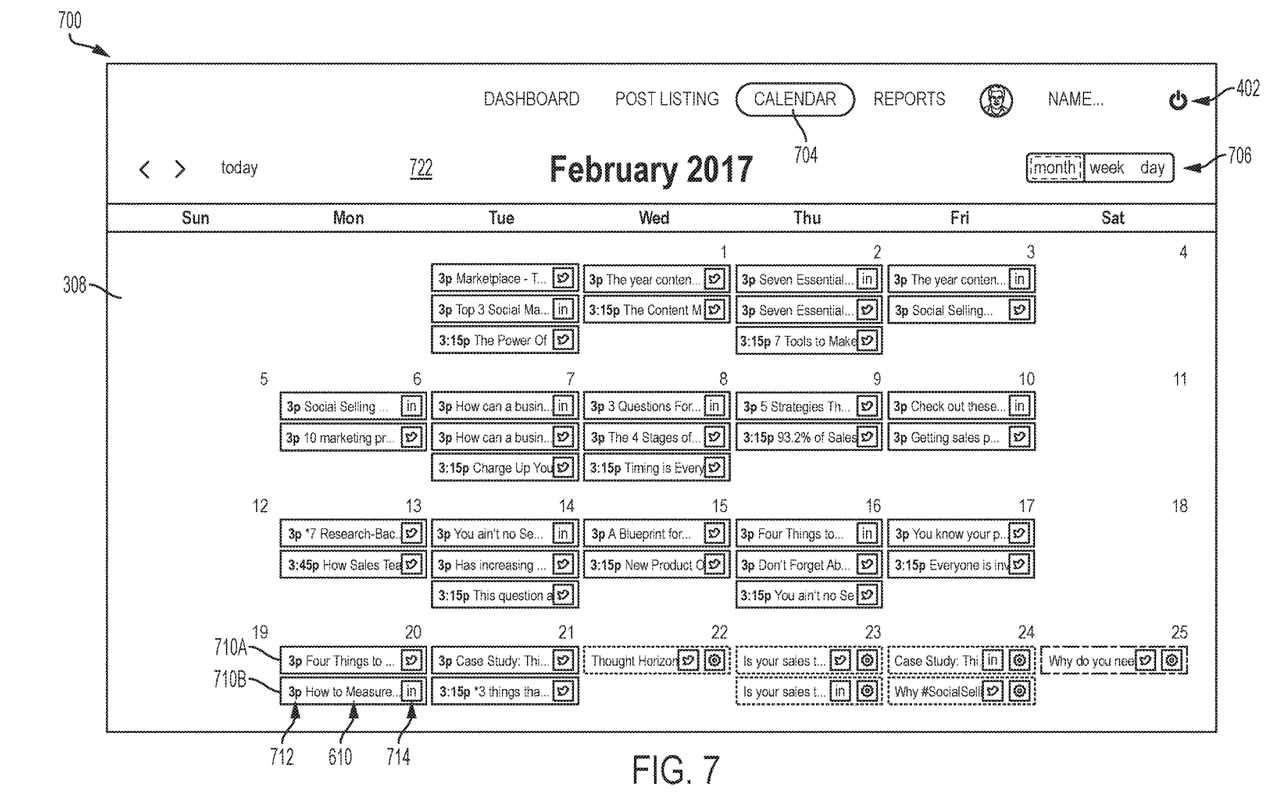
FIG. 7 is an example screen diagram showing a calendar view of selectable social media posts scheduled for a determined time period according to various embodiments described herein.

Turning now to FIG. 7, the scheduling component of the social media processing system 300 will be discussed. Selection of the calendar selector 704 from the screen selection list 402 launches the calendar screen 722, which is illustrated by on-screen diagram 700. Alternatively, selection of the posting schedule links 616 from the post listing screen 622 may additionally launch the calendar screen 722 of FIG. 7. The calendar screen 722 provides a visualization of the days and times in which social media posts 310 have been posted in the past, as well as of the days and times in which social media posts 310 are scheduled to be posted in the future. The calendar screen 722 may be configured in month, week, or day views using selector 706. The month view shown in FIG. 7 provides a post indicator 710 for each social media post 310 that has already been posted, or is scheduled to be posted, on a day within the month shown. Similarly, week or day views would show all post indicators 710 corresponding to social media posts 310 scheduled for the corresponding time period. For clarity purposes, reference numbers 710 have been omitted for all post indicators 710 with the exception of two, post indicators 710A and 710B. The description of post indicators 710A and 710B apply to all post indicators 710 corresponding to all social media posts 310 in the example month shown.

The post indicators 710A and 710B each have a time indicator 712 that shows the time in which the social media post 310 was posted to the applicable social media platform 312. The caption 610 corresponds to the title of the post 310 and the social media platform indicator 714 identifies the social media platform to which the post 310 was posted. In this example, the social media post 310 corresponding to the post indicator 710A was posted on Twitter at 3 pm on Feb. 20, 2017.

With the calendar screen 722, the user 306 is able to quickly and easily visualize the distribution of prior posts 310 and posts scheduled in the future for that given month. To further aid in visualization, the post indicators 710 may be color coded or otherwise visually distinguished from one another to provide additional useful information at a glance. For example, post indicators 710 may be blue if they were posted in the past, orange if they are scheduled to be posted in the future by Auto Pilot, and green if they are scheduled to be posted in the future by the user 306. As discussed above, one benefit of the social media processing system 300 is not only the automated post creation and distribution process provided by Auto Pilot, but also the ability for the user 306 to edit posts provided by Auto Pilot and manually create and add posts 310 to supplement those provided by Auto Pilot. Rather than color coding, FIG. 7 shows post indicators 710 that occurred in the past (for example, prior to February 22) outlined by a solid line, post indicators 710 that are scheduled to be posted in the future by Auto Pilot (for example, posts 310 scheduled to be posted on February 22-24) outlined by a dotted line, and post indicators 710 that are scheduled to be posted in the future by the user 306 (for example, the post scheduled to be posted on February 25) outlined by a broken line having line segments of differing lengths.

Using the calendar screen 722, the user 306 can not only visualize the post quantity and distribution throughout the month, but also quickly and easily revise the post scheduling and edit the posts 310. To edit posts scheduled for future posting, the user 306 can select the post indicator 710, which then results in the post being displayed in a panel or window on top of the calendar screen 722 for review and editing in one place, without navigating away from the calendar screen 722. Alternatively, the user 306 may select an edit button on the post indicator 710 to view the post 310, edit the post 310, or cancel the post 310.

From the perspective of the user 306, the social media processing system 300 significantly simplifies the social media content searching, analyzing, post creation, and posting process. According to various embodiments, the user 306 receives an email, text, or other notification from the social media module 302 on a given day of the week (for example, on Sunday). The notification will include a link that will provide the user 306 with the calendar screen 722. From this screen, the user can see the schedule for posting for the upcoming week, and may quickly and easily review and edit posts. The posts 310 are already applicable to the user's business or interests because of the customization provided by the user 306 when establishing categories 504 during the configuration process. The user 306 may then make any schedule modifications and add original social media posts 310 to those provided by the social media module 302. After exiting the system, the social media posts 310 are automatically posted to the applicable social media platforms 312 according to the schedule. If the user takes no action after receiving the notification that the posts 310 for the upcoming week are available, then the social media module 302 will proceed with posting according to the schedule after a predetermined grace period (for example, one day). This process provides the user 306 with an active and relevant social media presence with absolutely no action taken by the user, and an even enhanced experience when the user takes an active role in reviewing, editing, and supplementing the posts 310 created by the social media processing system 300.

Customization of the social media creation and distribution process by the user 306 provides posted content that is very relevant to the user 306 and unique to the user's personality while optimizing results. FIG. 5 illustrated the configuration process for establishing categories of social media content 304 and providing for a post quantity 508 per category 504. It should be appreciated that a significant customization beyond that shown and described with respect to FIG. 5 can be provided by the social media processing system 300 for advanced users. For example, while the social media posts 310 may be randomly spread across the days of a week for posting, the user 306 could configure the social media module 302 to schedule more posts for certain days of the week and less posts on others. Moreover, the user could schedule certain categories 504 of posts 310 for certain days or portions of the week, while other categories 504 are only posted periodically throughout a quarter or time period instead of every week. Moreover, the social media processing system 300 may allow the user 306 to configure the amount of time in which the social media posts 310 remain active or live on the corresponding social media platform 312. After a set amount of time determined by the user 306, the post 310 will be removed. The scheduling and customization potential is virtually limitless. The more customization that the user 306 provides, the greater the chance that the posting presence and content becomes an extension of the user's personality from the perspective of the audience, as if the user 306 were performing the entire social media post creation and distribution process manually.

Another feature of the social media processing system 300 is that the social media module 302 tracks any and all aspects of the posting process and provides a social media score that provides a useful measurement of effectiveness of the user's social media presence. The analytics tool provided by the social media processing system 300 indicates how well the user 306 is doing across multiple social media platforms 312 rather than any one platform. According to one embodiment, the social media score for a user 306 posting on Twitter and LinkedIn is determined using $$F(x)=k(APG)+l(\text{Manual Shares})+m(\text{engagements})+n$$
("Own Post" shares)+Number of Twitter Followers+Corporate Average of LinkedIn Followers where APG (Auto Post Quotient)=number of posts on average sent per week or determined time frame using the Auto Pilot feature, and k, l, m, and n are weighting factors. According to a more specific example for a user 306 posting on Twitter, LinkedIn and XING, the social media score may be determined using $$F(x)=\{(\text{Total Posts}*0.5)+\{[((\text{Number of Twitter Followers This Week or Determined Time Frame}-\text{Number of Twitter Followers Last Week})/(\text{Number of Twitter Followers Last Week})*10)+(\text{Twitter Followers This Week}/10)]*0.15\}+$$
[(Total clicks+Twitter Retweets+Twitter Likes+Twitter Mentions+Xing Mentions+Xing Favorites)*0.35]}*10.

It should be appreciated that the social media score may incorporate different types of weighting factors and variables without departing from the scope of this disclosure. The social media score is beneficial to the user 306 in that the score is based on factors that may be considered as positive or negative changes in engagements and interest across multiple social media platforms 312. The resulting score provides a useful measurement of effectiveness of the user's overall social media presence, as well as determining trends when tracking and comparing social media scores from week to week or period to period.

Figure 8:
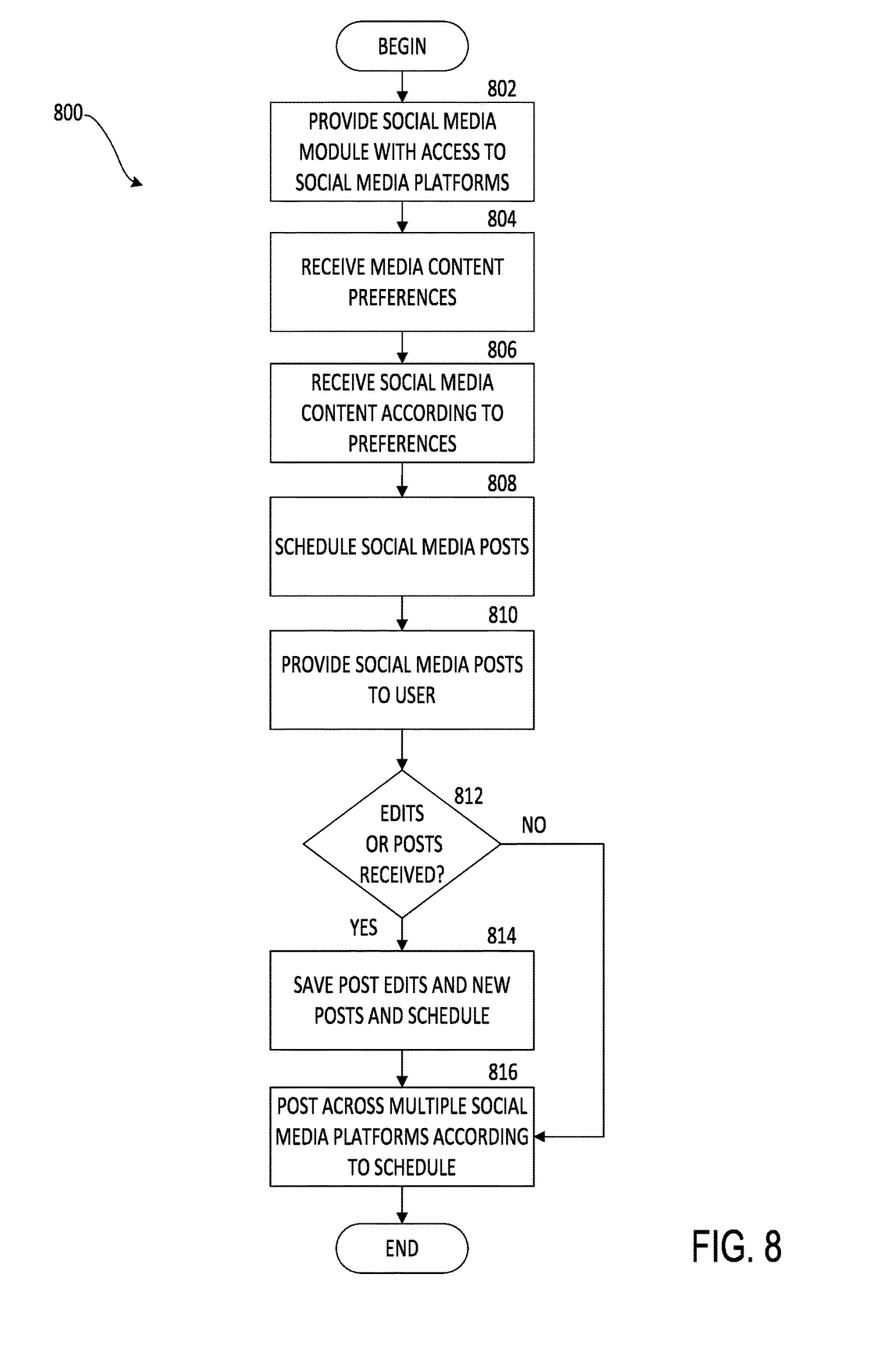
FIG. 8 is a flow chart showing an example of a process for electronically processing social media content performed by a social media engine according to various embodiments described herein.

FIG. 8 illustrates a routine 800 for processing social media content. The social media module 302, which may be executed by one or more computing devices of system 100, may perform this process. In exemplary embodiments, a server (e.g., server 140) in conjunction with a client computing device having a browser, execute the social media module 302 (e.g., computing devices 140, 150, 160, 170, 180, 190) through a network (network 110). In various exemplary embodiments, the social media module 302 may call upon other modules to perform certain functions. In exemplary embodiments, the software may also be organized as a single module to perform various computer executable routines.

The routine 800 begins at operation 802, where the social media module 302 is provided access to the social media platforms 312 associated with the user 306. This may occur via an initial setup and configuration process in which the user 306 provides social media login credentials to the social media module 302 via a GUI 308. The process 800 continues to operation 804, where the social media module 302 receives media content preferences 502. As discussed above, these preferences may include categories 504 and corresponding post quantities 508 per category 504. In addition, various embodiments provide for further customization with respect to the scheduling and distribution of social media posts 310 based on the type or source of social media content 304, personal preference of the user, or any other customization criteria.

From operation 804, the routine 800 continues to operation 806, where the social media module 302 receives the social media content 304 according to the media content preferences 502 entered by the user 306. As previously discussed, the social media module 302 may retrieve the social media content 304 from its source and create the corresponding social media posts 310 utilizing the post creation engine 314, or the social media module 302 may receive the social media content 304 in the form of created posts 310 from an external post creation engine 314 or other entity.

At operation 808, the social media module 302 schedules the social media posts 310 for posting according to the media content preferences 502, if any. Otherwise, the social media module 302 may schedule the social media posts 310 randomly across the determined period of time, such as a week. The routine 800 continues to operation 810, where the social media posts 310 are provided to the user 306. This operation may include providing a notification to the user 306 via email or text, and displaying the social media posts 310 for the user upon receipt of an access request resulting from the user selecting the link in the notification provided in the email or text. The social media posts 310 may be provided in the calendar screen 722 or the post listing screen 622.

From operation 810, the routine 800 continues to operation 812 where a determination is made as to whether the user 306 revised any of the social media posts 310 or corresponding posting schedules, or added new posts 310 created by the user 306. If not, then the routine 800 proceeds to operation 816, where the social media posts 310 are posted across the applicable social media platforms 312 according to the schedule and the routine 800 ends. However, if at operation 812, the user 306 did revise the automated social media posts 310 or schedules, or added created original social media posts 310, then the social media module 302 saves the edits or new posts 310 at operation 814 before continuing to operation 816 and posting to social media platforms 312 according to the schedule.

While this specification contains many specific embodiment details, these should not be construed as limitations on the scope of any disclosure or of what may be claimed, but rather as descriptions of features that may be specific to particular embodiments of particular disclosures. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Many modifications and other embodiments of the disclosure will come to mind to one skilled in the art to which this disclosure pertains having the benefit of the teachings presented in the foregoing descriptions and the associated drawings. While examples discussed above cover the use of various embodiments in the context of social media post creation and distribution, various embodiments may be used in any other suitable context. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A computer-implemented data processing method for electronically processing social media content, comprising:
   providing, by one or more computer processors, a social media module with access to a plurality of social media platforms associated with a user;
   receiving, by the social media module, a plurality of media content preferences associated with a preferred media content of the user and post quantity;
   receiving, by the social media module, social media content according to the plurality of media content preferences;
   providing, by the social media module, a plurality of social media posts corresponding to the social media content;
   scheduling, by the social media module, the plurality of social media posts over a determined time period according to the plurality of media content preferences;
   posting, by the social media module, the plurality of social media posts to the plurality of social media platforms according to the schedule over the determined time period;
   measuring a first quantity of a first plurality of social media posts sent per a determined timeframe, the first plurality of social media posts being from the plurality of social media posts that are provided to the user;
   measuring a second quantity of a second plurality of social media posts sent per the determined timeframe, the second plurality of social media posts being from the plurality of social media posts that are provided by the user;
   measuring a quantity of engagements associated with the first plurality and the second plurality of social media posts;
   measuring a quantity of social media followers over the plurality of social media platforms;
   utilizing the first quantity of the first plurality of social media posts, the second quantity of the second plurality of social media posts, the quantity of engagements, and the quantity of social media followers to determine a social media quality rating; and
   providing the social media quality rating to the user.

2. The computer-implemented data processing method of claim 1, wherein the plurality of media content preferences associated with the preferred media content of the user comprises one or more categories of social media content selected from a plurality of categories of media content.

3. The computer-implemented data processing method of claim 2, wherein the plurality of categories of media content correspond to media content subject matter.

4. The computer-implemented data processing method of claim 2, wherein the plurality of categories of media content correspond to a plurality of media content sources.

5. The computer-implemented data processing method of claim 2, wherein the plurality of categories of media content are defined by the user.

6. The computer-implemented data processing method of claim 1, wherein the plurality of media content preferences associated with the preferred media content of the user comprises a quantity of social media posts to provide across the plurality of social media platforms per week.

7. The computer-implemented data processing method of claim 1, wherein providing the plurality of social media posts corresponding to the social media content comprises providing the plurality of media posts on a display screen, each social media post selectable for viewing and editing within a panel without leaving the display screen.

8. The computer-implemented data processing method of claim 1, wherein providing the plurality of social media posts corresponding to the social media content comprises providing a plurality of post indicators corresponding to the plurality of social media posts in a calendar according to a scheduled posting day of each link.

9. The computer-implemented data processing method of claim 8, wherein each of the plurality of post indicators is selectable to provide the social media post associated with the post indicator for editing prior to posting.

10. The computer-implemented data processing method of claim 1, further comprising receiving a manual social media post input by the user and posting the manual social media post with the plurality of social media posts.

11. The computer-implemented data processing method of claim 1, wherein providing the plurality of social media posts corresponding to the social media content comprises for each social media post:
    providing an image associated with the social media content; and
    providing a caption associated with the social media content.

12. The computer-implemented data processing method of claim 11, further comprising providing a link to the social media content.

13. The computer-implemented data processing method of claim 11, further comprising:
    determining if a social media post associated with the social media content has been provided for a second user of an organization comprising the user and the second user; and
    in response to determining that the social media post associated with the social media content has been provided for the second user, modifying the caption or the image such that identical social media posts are not provided to the user and to the second user.

14. The computer-implemented data processing method of claim 11, wherein the caption is provided according to a selected voice determined by the user.

15. The computer-implemented data processing method of claim 11, wherein the selected voice comprises a formal character, an informal character, a sarcastic character, or a humorous character.

16. A computer-implemented data processing method for electronically processing social media content, comprising:
    providing, by one or more computer processors, a social media module with access to a plurality of social media platforms associated with a user;
    receiving, by the social media module, one or more categories of media content selected from a plurality of categories of media content;
    receiving, by the social media module, social media content according to the one or more categories of media content;
    providing, by the social media module, a plurality of social media posts on a display screen according to the social media content and to a desired quantity of social media posts per a determined time period, each social media post selectable for viewing and editing within a panel without leaving the display screen;
    scheduling, by the social media module, the plurality of social media posts over the determined time period;
    posting, by the social media module, the plurality of social media posts to the plurality of social media platforms according to the schedule over the determined time period;
    measuring a first quantity of a first plurality of social media posts sent per a determined timeframe, the first plurality of social media posts being from the plurality of social media posts that are provided to the user;
    measuring a second quantity of a second plurality of social media posts sent per the determined timeframe, the second plurality of social media posts being from the plurality of social media posts that are provided by the user;
    measuring a quantity of engagements associated with the first plurality and the second plurality of social media posts;
    measuring a quantity of social media followers over the plurality of social media platforms;
    utilizing the first quantity of the first plurality of social media posts, the second quantity of the second plurality of social media posts, the quantity of engagements, and the quantity of social media followers to determine a social media quality rating; and
    providing the social media quality rating to the user.

17. The computer-implemented data processing method of claim 16, wherein the plurality of categories of media content correspond to media content subject matter.

18. The computer-implemented data processing method of claim 16, wherein the plurality of categories of media content correspond to a plurality of media content sources.

19. The computer-implemented data processing method of claim 16, wherein the plurality of categories of media content are defined by the user.

20. The computer-implemented data processing method of claim 16, wherein providing the plurality of social media posts comprises providing a plurality of post indicators corresponding to the plurality of social media posts in a calendar according to a scheduled posting day of each link.

21. The computer-implemented data processing method of claim 16, further comprising receiving a manual social media post input by the user and posting the manual social media post with the plurality of social media posts.

* * * * *